July 19, 1949.  C. E. GARNER ET AL  2,476,721
JIG FOR ASSEMBLING CASKETS OR COFFINS
Filed Jan. 3, 1946  3 Sheets-Sheet 1

Inventor
CLIDITH E. GARNER
LOUIS C. KRAMP
JESSE D. MATLOCK Jr.
JOE H. JAMELL

By Clarence A. O'Brien
and Harvey B. Jacobson
Attorneys

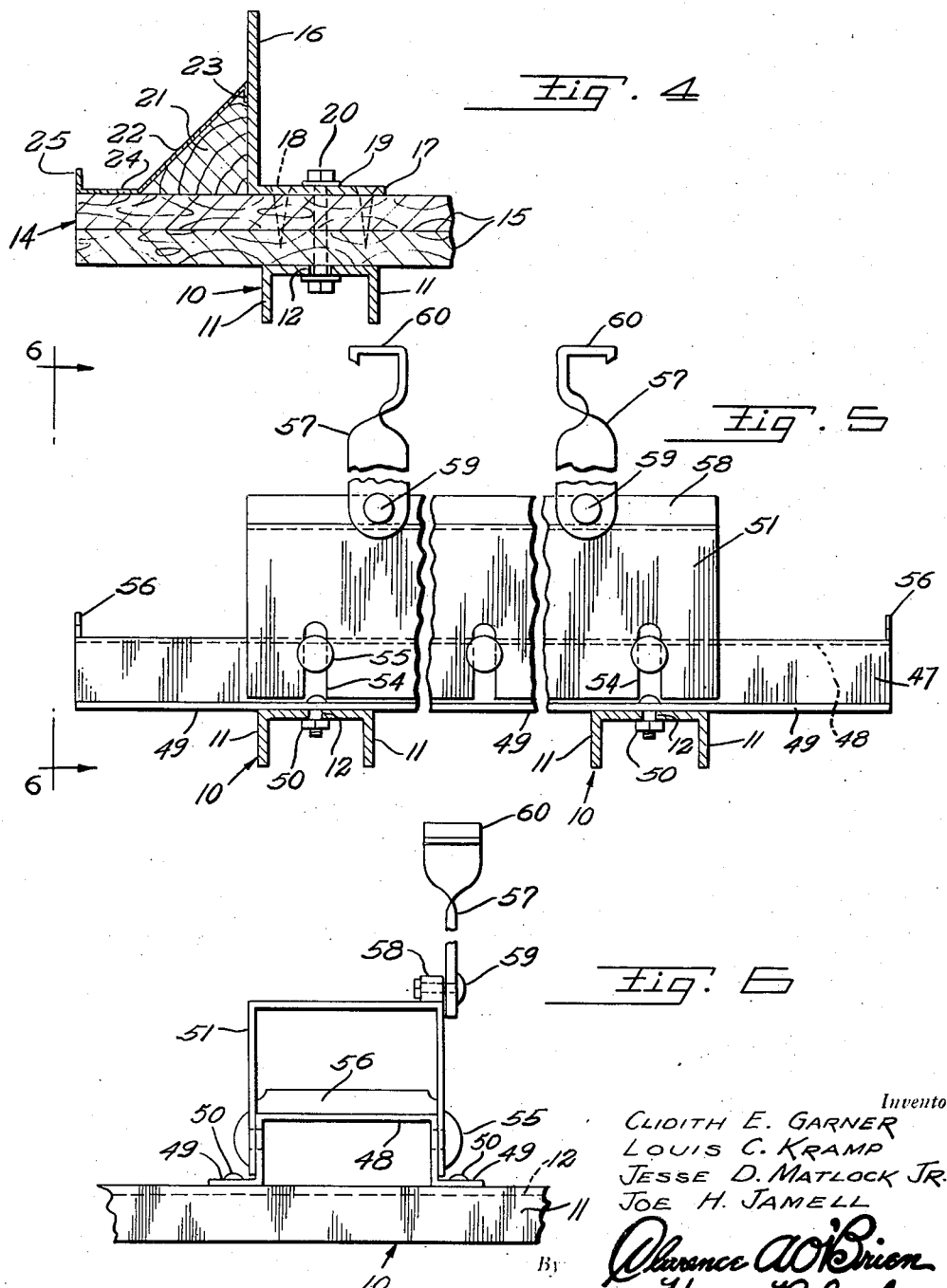

July 19, 1949.  C. E. GARNER ET AL  2,476,721
JIG FOR ASSEMBLING CASKETS OR COFFINS
Filed Jan. 3, 1946  3 Sheets-Sheet 3
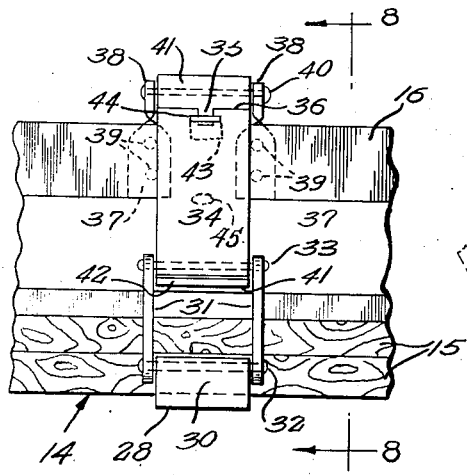
Fig. 7
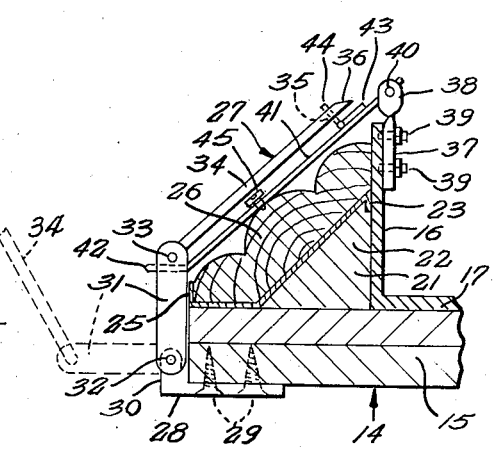
Fig. 8
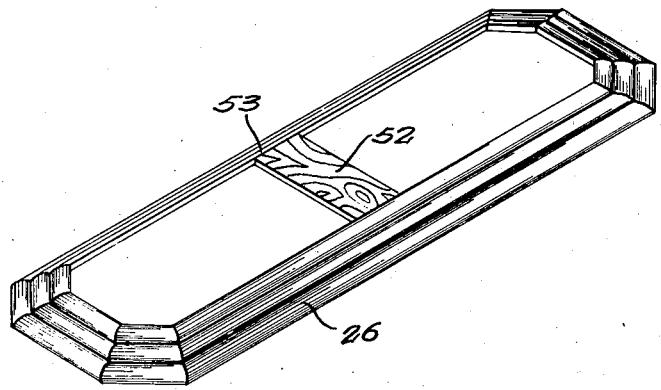
Fig. 9
Fig. 10
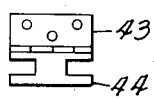
Inventor
CLIDITH E. GARNER
LOUIS C. KRAMP
JESSE D. MATLOCK JR.
JOE H. JAMELL
By Clarence A. O'Brien
and Harvey B. Jacobson
Attorneys Patented July 19, 1949

2,476,721

UNITED STATES PATENT OFFICE 2,476,721

JIG FOR ASSEMBLING CASKETS OR COFFINS

Clidith E. Garner, Jesse D. Matlock, Jr., Louis C. Kramp, and Joe H. Jamell, Fort Smith, Ark.

Application January 3, 1946, Serial No. 638,720

7 Claims. (Cl. 144—288)

1

This invention relates to jigs for assembling caskets or coffins.

An object of the invention is to provide a jig which will facilitate and cheapen the cost of constructing coffins or caskets and in assembling the frame, body and panel or top of a casket or coffin, so that the parts or sections forming the same, may be accurately placed in proper relation and held by means of clamps, adjustable according to the sizes of the parts, so that they may be held in assembled relation to facilitate the nailing, gluing or fastening together thereof to form the complete coffin or casket.

Another object of the invention is to provide a jig which may be supported on a suitable table so as to permit working in a horizontal plane in the shop and provided with end heads for holding the parts forming the ends of the frame and other parts of the casket for securing the same together and mounting clamps for holding said parts down when assembled, for fastening the same, and also to provide means for supporting and fastening a center piece or bridge in the casket or coffin frame, and for similarly assembling and fastening the parts of the frame, body and panel or top of the casket or coffin, whereby the manufacture is greatly facilitated and the cost thereof reduced materially. While the invention is shown in connection with the assembling of the frame of the coffin or casket, it is to be understood that the same can be used in the construction of the body, and panel or top of a casket or coffin by varying the sizes of the parts and the length of the clamps employed in connection therewith for holding down the ends and sides of the casket, a larger jig being used to construct the body and a smaller jig to produce the top or panel, as it is thought will be well understood by those skilled in the art.

Another object of the invention is to provide a novel adjustable center rail for supporting the center piece or bridge of the casket or coffin frame in position together with center clamp holders, to hold down the frame while nailing in the bridge or center piece of the frame of the casket or coffin.

Another object of the invention is to provide clamps for the end head of the jig for clamping the ends of the frame while fastening the same to the bottom thereof.

Other objects and advantages reside in the details of construction and operation as more fully hereinafter described and claimed, reference being had to the accompanying drawings forming

2 part hereof, wherein like numerals refer to like parts throughout, and in which:

Figure 4 is an enlarged fragmentary transverse sectional view taken on the line 4—4 of Figure 1.

Figure 5 is an enlarged transverse sectional view taken on the line 5—5 of Figure 1.

Figure 6 is an end elevation looking in the plane of the line 6—6 of Figure 5.

Figure 7 is a fragmentary enlarged end elevation showing one of the end clamps or clamp holders.

Figure 8 is a side elevation thereof with the end of the casket or coffin in section as indicated on the end head of the jig, taken on the line 8—8 of Figure 7.

Figure 9 is a perspective view of a frame assembled with the jig, and

Figure 10 is a detail of a hinge fastener for an end head clamp.

Figure 1:
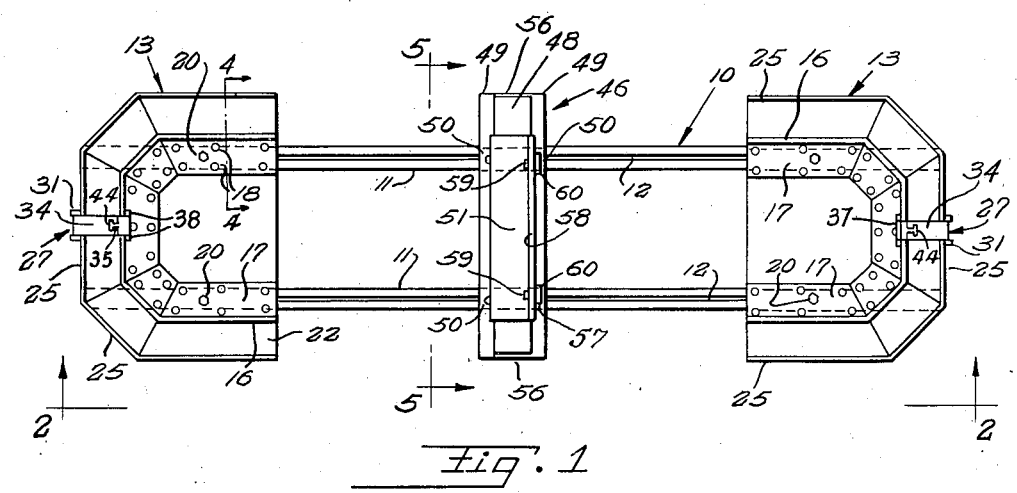
Figure 1 is a plan view of a jig used in the construction of coffins or caskets and in assembling the frame, body and panel or top thereof.
Figure 2:
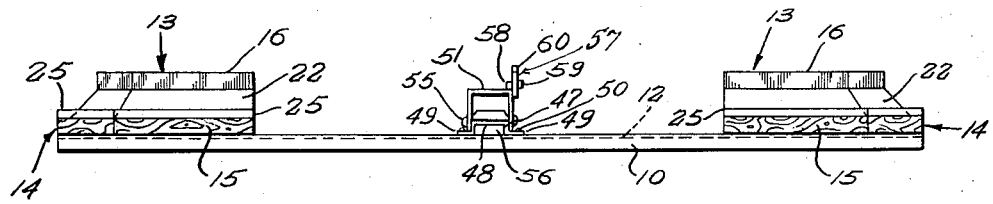
Figure 2 is a side elevation of the jig as shown in Figure 1, looking in the direction of the line 2—2 of Fig. 1.
Figure 3:
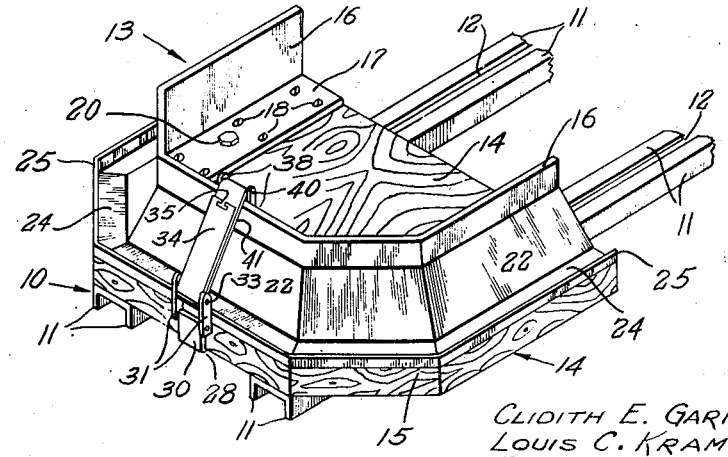
Figure 3 is a fragmentary perspective view of one end of the jig on an enlarged scale.

Referring to the drawings in detail, the jig is adapted to be used on a table of suitable size to accommodate the width and length thereof so as to permit assembling in the shop on a horizontal plane. It comprises two tracks 10 in spaced parallel relation, each comprising a pair of angle iron members 11 placed with the flanges thereof vertical and horizontal, the horizontal flanges extending toward each other to provide spaced slots 12, which like the tracks are disposed in spaced parallel relation.

Mounted upon the ends of the tracks or guideways 10, are end heads 13 disposed in opposite positions and alike in construction. Each end head consists of a base 14 consisting of two sections 15 of wood forming a two-ply base on which are arranged angle iron sections 16 depending upon the shape or end formation of the coffin or casket to be produced. These angle iron pieces have horizontal flanges 17 provided with screw holes for attaching the same to the base by screws, nails or other fastening means 18 as shown more particularly in Figure 4 of the drawings. The angle iron sections 16 may be in one piece suitably bent to form a transverse end portion and diagonal corner portions meeting the sides, and horizontal flanges at the side portions are provided each with a hole 19 for receiving a bolt 20 which extends through the wood base 14 and the slots 12 of the tracks 10 for adjustably bolting the same into position thereon, although the end heads are held fixed or stationary when in use, according to the length and width of the casket and frame thereof. The vertical or upstanding flanges or sides of the angle iron sections 16 are spaced inwardly from the surrounding edges of the base 14 to provide projecting portions in which filler blocks 21 are fitted, said blocks being shown of triangular cross section to provide sloping outer sides. These blocks terminate short of the surrounding edges of the base 14 and are covered with sheet iron or the like as indicated at 22 having down-turned inner flanges or edge portions 23 embedded in or secured to the blocks, horizontal outer portions 24 resting on the base 14 at its upper surface around and outwardly of the filler blocks 21 and having upturned retaining flanges or shoulders 25 at the outer edges thereof in alignment with the outer and surrounding edges of the base 14 so as to support and retain the frame or molding sections 26 of the casket or coffin frame thereon. While the inclined surface or hypotenuse of the triangular portion or block and cover plate are shown disposed at a 45° angle, it is to be understood that this angle may be varied as desired depending upon the formation of the frame 26 which as shown in Figure 8 of the drawings, is fitted against the upstanding or vertical flange of the angle members 16 at its upper and inner beveled edge, against the angular support or cover plate 22 and its horizontal portion 24, and retained by the flange, stop or shoulder 25 so as to be properly held in position for assembly and connection of the ends of the sections thereof fitting the sides and angular faces at the ends of the frame and of the jig which retains said parts in position, to be fastened by gluing, nailing or otherwise so that the frame is held as a single unit.

In order to hold the sections of the frame in position while being fastened together, they are placed upon the jig in the manner described with their ends abutting and glued if desired, or otherwise additionally fastened and held down by clamp holders 27 more particularly shown in Figures 7 and 8 of the drawings. These clamps comprise angle pieces 28 forming attaching means to secure the same to the bottom of the base 14 as indicated at 29, by holes through the bottom plate portions of the angle pieces receiving screws extending upwardly into the base and having an upstanding apertured portion 30 adjacent or against the edge of the base at the end of the jig and frame to be constructed thereon, to pivotally support a pair of spaced vertical parallel links 31 at a pivot 32. The upper ends of the links 31 extend above the flange or shoulder 25 and pivotally support at 33, a bar or plate 34 having a notch or recess 35 centrally of its free end. This end is also preferably beveled as indicated at 36. Attached to the vertical flange of the angle member 16, at the inside thereof, are brackets 37 having spaced apertured ears 38 extending above the top edge of the angle piece or plate 16, the brackets being bolted in spaced parallel relation through the plate or flange of the angle iron section 16, as indicated at 39, although other suitable pivot ears may be provided thereon either separately or formed integral therewith. Pivoted to the angle piece or plate 16 above the top edge thereof, as through the medium of the aperture ears 38 as at 40, is a bar or plate 41 so as to swing in an opposite direction from the bar 34 and under the same. The bar 41 has an angular end 42 disposed at obtuse angles to the main or body portion thereof, at its lower end, designed when the bar 34 is swung upwardly and outwardly and downwardly with the links 31, to be engaged beneath the bar 34 and the pivot 33 thereof upon swinging the links upwardly over the end 42 of the bar 41 under the pivot 33, to retain the bar 41 against the molding of the frame 26 as shown in Figure 8 of the drawings in order to hold the latter in position. The bar 34 is then swung inwardly and downwardly and held thereagainst by means of a hinge or hinge-like fastener 43 secured to the top face of the bar 41 adjacent to the pivot 40 thereof or formed integral therewith and having a T-shaped leaf 44 providing a head or cross bar, the shank of which is adapted to enter the notch 35 with the head or cross-bar thereof spanning the notch 35 against the top face of the bar 34, to retain the clamp locked. A set screw 45 may be provided through the bar 41 to engage against the face of the intermediate portion of the molding frame 26 and may have a binding nut thereon to hold the same in clamped position to retain the frame molding 26 against displacement and firmly against the end head of the jig. The other sections of the frame 26 can be glued together at their abutting ends or otherwise fastened by nails, screws or other means.

As means for putting in the center piece of the casket or coffin frame, a cross center rail construction 46 is provided, the same comprising an inverted channel member 47 having the bight or connecting portion 48 at the top and the side flanges extending downwardly with out-turned bottom flanges 49 and attached to the track rails or guide ways 10 by means of bolts 50 engaged through the slots 12 to clamp the same in position and permit adjustment thereof backward and forward or lengthwise of the tracks by loosening the bolts. Inverted channels 51 forming the center rails proper are mounted over the channels 48 for vertical adjustment, that is, adjustment up and down and to support thereon a center piece or bridge 52 which is set in the molding frame 26 and secured at its ends to the sides of the frame by gluing, nails, or other fastenings as indicated at 53 in Figure 9 of the drawings. For this purpose, the channel 51 fits over the channel 48 as shown in Figures 5 and 6 of the drawings and has vertical slots 54 engaged with the shanks of bolts or rivets 55 carried by the side flanges of the channel 48 in spaced relation to the surfaces thereof for frictional adjustment up and down, and in case of bolts, to be loosened or tightened for the purpose of permitting the necessary vertical adjustment. Thus the center piece or bridge 52 of the casket frame may be firmly held in the exact position required when the clamping means 55 which guides the center rail in its movements, are tightened. The ends of the channels 48 are provided with upstanding stops or flanges 56 which retain the side strips of the frame 26 in position in assembled relation, by engagement thereagainst. In order to hold the side strips of the frame 26 in position, while being glued or fastened in any other manner, center clamp holders 57 are provided, the same comprising strips of bar metal pivoted to the channel member 51 against one side or face thereof as by means of a lug or strip 58 secured to the top or bight portion of the channel 51 along one edge or side, or apertured pivot lug for this purpose to receive the pivots or pivot bolts 59 constituting horizontal fulcrums for the arms or clamps 57 so that they can swing laterally and like the brackets or arms 37, having their upper ends twisted at right angles, but instead of having pivot ears as at 38, are formed with hooks 60 extending outwardly and laterally to engage over the top edges of the strips at the sides of the frame 26 or corresponding flanges the same as the angle iron pieces 16, in order to retain the same in position while the frame is being assembled and the sections thereof secured or fastened together. The strip or lugs 58 thus form a stop for the center piece or bridge 52 of the casket frame 26 so that the same may be accurately mounted in the center of the length of the frame and glued or otherwise fastened when the centerpiece or bridge 52 is set upon the channel 51 forming the centerpiece or bridge support therefor in connection with the channel 47. By the use of the jig, the labor on the assembly of a casket or coffin is much less than without the jig, so that economical assembly or production is insured at a minimum cost. Also, it is to be understood that in addition to the frame, the body and panel or top of a casket or coffin may be assembled and secured in the same manner independently or in assembled relation, by merely varying the sizes and proportions of parts, and especially of the length of the clamps on the center rail and end heads of the jig so as to fit over the top edges of the angle members or sections of the frame when the same are mounted on the jig, in order to retain them while being fastened together. It is thought that this will be well understood by those acquainted with the art.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

What we claim is:

1. A jig for assembling caskets or coffins, comprising track rails, end heads comprising bevelled forms mounted on the rails and adjustable toward and away from each other to receive the sections of a coffin thereon and having means to engage the coffin frame to hold the same against outward displacement, and a transverse vertically and longitudinally adjustable center rail on the track rails for mounting a center bridge of the coffin frame between the sides of the frame to facilitate connecting said parts.

2. A jig for assembling caskets or coffins, comprising spaced parallel track rails having guide ways, end heads secured to said rails through said guide ways and adjustable thereon, and an adjustable center rail mounted across the track rails and in the guide ways thereof, said end heads comprising a base member, upright plates thereon having inclined surfaces on the outside adapted to support similarly inclined surfaces of coffin sections thereon and retaining flanges at the outer edges of said base member, to retain the sections of a coffin thereagainst, and end clamps carried by the base and adapted to extend over the sections of the casket and top edges of the plates, to secure the latter against the base and track rails.

3. A jig for assembling caskets or coffins, comprising spaced parallel track rails having guide ways, end heads secured to said rails through said guide ways and adjustable thereon, and an adjustable center rail mounted across the track rails and in the guide ways thereof, said end heads comprising a base member, upright plates thereon having inclined surfaces on the outside and adapted to support similarly inclined surfaces of coffin sections thereon and retaining flanges at the outer edges of said base member, clamps attached to the base and adapted to be engaged with the tops of the plates to retain the sections of a casket therearound in assembled relation abutted end to end, and clamps on the center rail adapted to engage over the top edges of plates and side strips of the casket while securing the sections of the casket together.

4. A jig for assembling caskets or coffins, comprising spaced parallel track rails having guide ways, end heads secured to said rails through said guide ways and adjustable thereon, and an adjustable center rail mounted across the track rails and in the guide ways thereof, said end heads comprising a base member, upright plates thereon having inclined surfaces on the outside and adapted to support similarly inclined surfaces of coffin sections thereon and retaining flanges at the outer edges of said base member, said center rail being adapted for vertical adjustment to position the center bridge of a casket between the sides thereof and for securing the same in position centrally of the length of the casket.

5. A jig for assembling caskets or coffins, including spaced guide rails, end members thereon having bases and angle plates secured thereto with upstanding portions and inclined outer portions with upstanding outer edges forming flanges, filler blocks beneath said inclined portions, and end clamps on the end members between the outer ends of the bases and the top edges of the upstanding portions of the angle plates to retain the coffin sections against said inclined portions.

6. A jig for assembling caskets or coffins, including spaced side rails, end members thereon having angle plates secured thereto with upstanding portions and outer flanges adapted to retain coffin sections thereon in assembled relation, and end clamps on the end members, comprising arms secured pivotally to the outer ends of the end members and upstanding portions of the plates, and means for securing said arms in overlapping relation to the coffin sections on the end members to retain the same therebeneath and against the end members and angle plates.

7. A jig for assembling caskets or coffins comprising spaced parallel track rails having guide slots longitudinally thereof, end heads extending across and outwardly of said track rails, means for securing said end heads for longitudinal adjustment along the track rails through said slots and shaped to correspond to the ends of the casket formed thereon, an adjustable transverse center rail mounted across the track rails and comprising a first channel having end stops and adjustable along said track rails and a second channel adjustably mounted on the first channel for raising and lowering the same to support the center bridge of the coffin frame thereon between the sides of the coffin frame to facilitate connecting said parts and means on the center rail to engage and hold the sides of a coffin frame in assembled relation thereon.

CLIDITH E. GARNER.
JESSE D. MATLOCK, JR.
LOUIS C. KRAMP.
JOE H. JAMELL.

REFERENCES CITED

The following references are of record in the file of this patent:

UNITED STATES PATENTS

| Number | Name | Date |
|---|---|---|
| 500,364 | Baker | June 27, 1893 |
| 767,876 | Eichblatt | Aug. 16, 1904 |
| 818,848 | Pond | Apr. 24, 1906 |
| 867,661 | Keating | Oct. 8, 1907 |
| 934,939 | Trickey et al. | Sept. 21, 1909 |
| 1,074,639 | Moore | Oct. 7, 1913 |
| 2,029,650 | Betz | Feb. 4, 1936 |
| 2,114,390 | Lancaster | Apr. 19, 1938 |
| 2,410,330 | Ashenfelter | Oct. 29, 1946 |